April 16, 1940.  L. G. ELLIS ET AL  2,197,493
ELECTRICAL PROSPECTING APPARATUS
Filed April 11, 1939
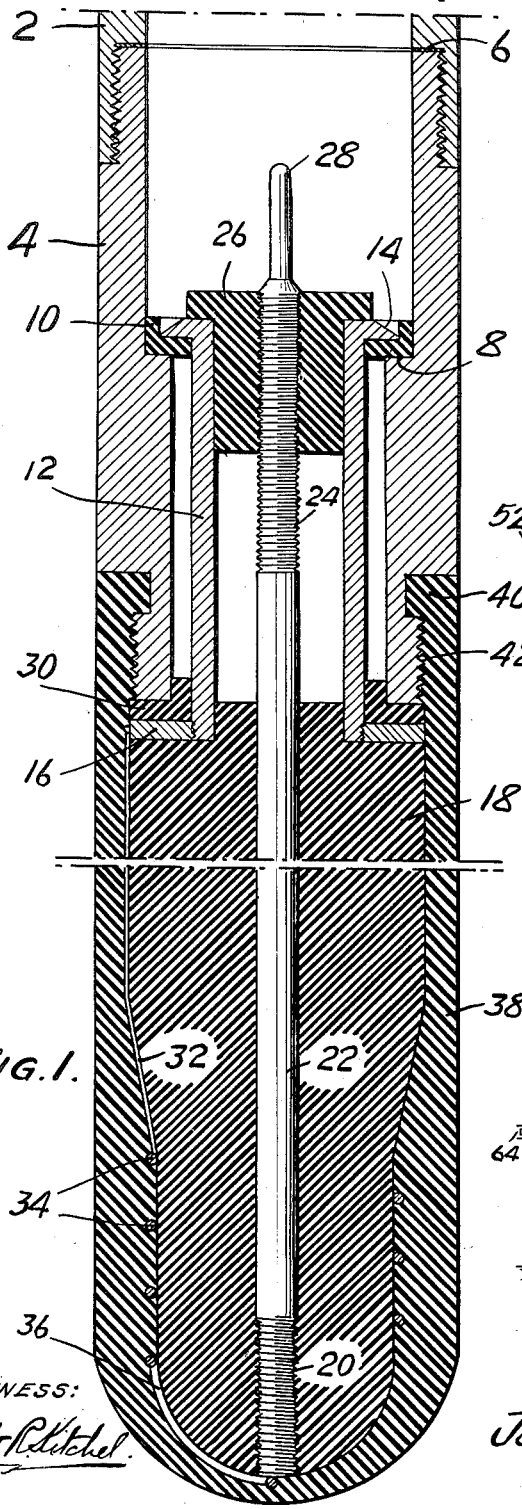
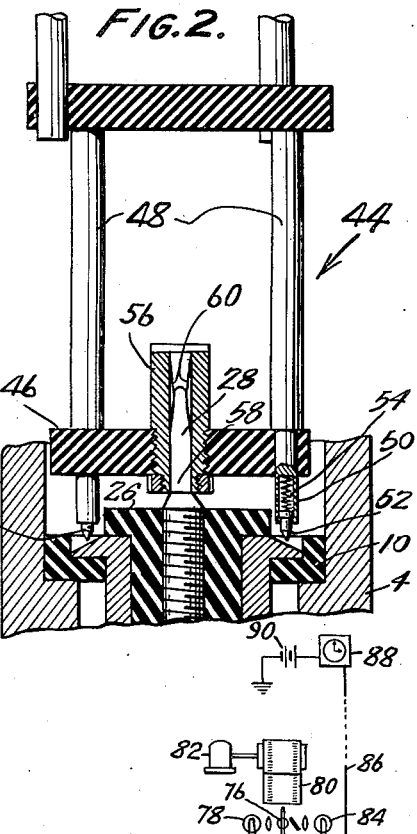
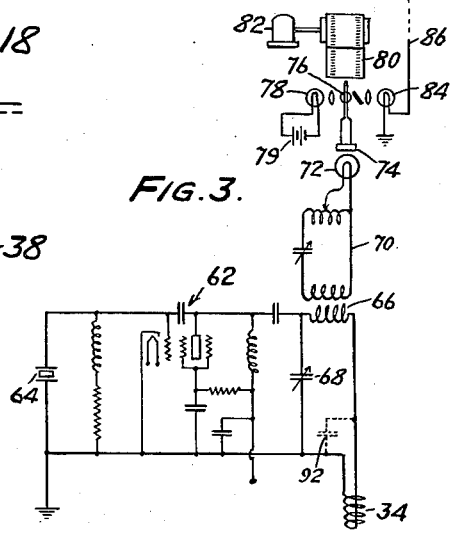
INVENTORS
Lacoste G. Ellis and
John W. Millington
BY
ATTORNEYS.
WITNESS:

Patented Apr. 16, 1940

2,197,493

UNITED STATES PATENT OFFICE 2,197,493

ELECTRICAL PROSPECTING APPARATUS

Lacoste G. Ellis and John W. Millington, Beaumont, Tex., assignors to Sperry-Sun Well Surveying Company, Philadelphia, Pa., a corporation of Delaware Application April 11, 1939, Serial No. 267,236

7 Claims. (Cl. 175—182)

This invention relates to geophysical prospecting, and more particularly, by so-called electrical coring, to the determination of the nature and boundaries of formations traversed by bore holes.

In the application of Bazzoni and Razek, Serial No. 72,246, filed April 2, 1936, now Patent No. 2,167,630 of August 1, 1939, there is described a method and apparatus for electrical prospecting involving lowering into a bore hole an apparatus arranged to propagate high frequency oscillations into strata surrounding the apparatus. By causing the oscillation producing apparatus to be affected by the strata in its vicinity, a measurement of the electrical conditions of the apparatus will give an indication of the formations which are encountered. The various matters to be taken into account in securing results from apparatus of such type are fully described in said application, and reference may be made thereto for a more general description of the problems which arise.

In an apparatus of the high frequency type just mentioned, and in other electrical coring apparatus using, for example, electrodes carrying direct current or low frequency currents, if power supply or recording apparatus is located in a casing adapted to be lowered through the bore hole, there is involved the difficulty of providing conductors extending from apparatus within a protective casing to radiating means, in the case of high frequency apparatus, or to power or detecting electrodes in low frequency or direct current apparatus. In deep bore holes which contain mud, during the electrical logging procedure there are encountered enormous pressures of such order as to cause failure of any parts insufficiently massive to resist them, and specifically in the case of insulating materials flow thereof to such extent as to produce failure. Provision of electrical leads through the walls of a protective casing is accordingly a major problem in the design of any such apparatus, inasmuch as it is always necessary to insulate one or more of such leads from the protective casing carrying the generating or detecting devices.

It is one object of the present invention to provide an insulated packing arrangement for passing electrical currents through a protective casing which is going to be subjected to the enormous pressures existing in deep bore holes.

It has been found that in electrical logging with high frequency currents the best results are secured at the high radio frequencies. Resonant circuits at such frequencies must contain low inductance and capacities, and for best results a major portion of the inductance of the resonant radiating circuit must be concentrated in an exploratory coil exterior to and spaced substantially from the casing which contains the generating apparatus so as to have a maximum variation in the circuit due to differences in surrounding strata. The inductances in the other parts of the circuit must, therefore, be kept at a minimum and there must be minimized to the greatest possible extent an objectionable amount of inductance where the leads pass through an opening in a steel casing.

Additionally, stray capacities constitute a factor which must be taken into consideration and there must be minimized the capacities which exist between various leads and between any such leads and the walls of the casing.

It is, therefore, a further object of the present invention to provide, consistently with proper packing against very high pressures, arrangements for leading high frequency currents to an exploratory coil in such fashion as to avoid stray inductances and capacities which are not permissible at the high frequencies used.

The above and more specific objects of the invention will be apparent from the following description, read in conjunction with the accompanying drawing, in which:

Figure 1 is a sectional view through the field producing means and the packing devices provided for the passage of high frequency leads through the protective casing;

Figure 2 is a longitudinal section through the lower part of the apparatus supporting frame, illustrating particularly means for making electrical connections consistent with the threading together of parts of the apparatus; and Figure 3 is a wiring diagram showing the oscillation producing and recording apparatus for a logging device of high frequency type.

The apparatus need not be described in great detail, since the major parts thereof may be provided in accordance with the disclosure of said Bazzoni and Razek application. The high frequency generating apparatus and recording apparatus are located within a casing 2 capable of withstanding the pressures encountered in a deep bore hole. The present invention is primarily concerned with a lower nose for this casing, which is illustrated in section in Figure 1.

The nose for the casing comprises an upper metallic tubular section 4 adapted to be threaded into the casing 2 with the interposition of suitable packing indicated at 6 to provide a fluid-tight joint. The tubular section 4 is provided with an annular internal shoulder 8 on which is adapted to seat a flanged ring 10 of insulating material, preferably Bakelite or similar thermoplastic material adapted to withstand high pressures. On the ring 10 there is adapted to be seated an upper flange of a tubular member 12, the flange of which is outwardly beveled as indicated at 14 to provide an electrical contacting surface as hereafter described.

The lower end of the member 12 is threaded for reception within a metallic ring 16, which is molded as part of an insulating nosepiece 18 of Bakelite or similar material capable of withstanding very high pressures. The nosepiece 18 has a central bore and is threaded at its lower end to receive the threaded end 20 of a metallic rod 22 which projects beyond its upper end and is threaded at 24 for the reception of a nut 26 of insulating material such as Bakelite. The upper end of the rod 22 is reduced to provide a pin 28.

The nosepiece 18 is adapted to be assembled to the member 4 by means of the various elements so far described in conjunction with an insulating ring 30, adapted to be interposed between members 4 and 16. By assembling the various parts as illustrated in Figure 1 and tightening the Bakelite nut 26, the parts, which should have carefully machined contacting surfaces, may be drawn very tightly together.

Electrical contact is provided between the metallic ring 16 and a coil 34 of a few turns by means of a metallic strip 32 which may be soldered or otherwise conductively secured to the ring 16 and the coil. The coil 34 at the high frequencies which are desirably used comprises only a few turns, though more turns may be used in the event that lower frequencies are used for exploration purposes. The lower end of the coil is joined electrically to the pin 22, as indicated at 36. The coil 34 must be substantially spaced from the lower annular metallic portions of the nose assembly to prevent their acting as short circuiting secondaries.

Following assembly of the nosepiece and the making of the aforesaid electrical connections to the coil, the entire assembly from the lower portion of the member 4 downwardly is heavily wound with unvulcanized rubber tape known commercially under the name "okonite". This winding is indicated at 38 and is wound as indicated at 40 into a lower annular groove in member 4 and about a threaded portion thereof, as indicated at 42. While this rubber tape is originally applied in the form of a wrapping, the high pressures and temperatures which are encountered on the first descent into a bore hole serve to compact the tape and vulcanize it into a solid mass of rubber encasing the nosepiece and the lower portion of member 4. The high pressures which are encountered force it extremely tightly about the threads 42 and may cause it to penetrate to some slight extent between the compacting surfaces of the member 4, ring 30 and ring 16 and into the lower portions of the thread 20 on the rod 22. With careful machining, however, the clearances are so extremely small and the resistance to flow of the rubber so great that the penetration will take place to only a minor extent before vulcanization and hardening to a final condition takes place. The result, therefore, of an initial test run which is always made with an apparatus is to provide automatically a solid casing of rubber about the coil and the joints which are provided in the assembly of the nosepiece to the metallic parts of the apparatus.

The various parts of the generating and measuring apparatus are preferably mounted on a frame 44, which, except for its lower part, may take any convenient form, and hence need not be described in detail. At the lower part of this frame there is provided a disc 46 of insulating material such as Bakelite, joined to the upper portion of the frame by metallic rods 48. The rods 48 are provided at their lower ends with sockets 50 in which are located a plurality of contact pins 52 urged outwardly by springs 54 and limited in their outward movements by suitable flanges formed at the outer ends of the sockets. The contact pins 52 are adapted to engage the beveled surface 14 of the flange of member 12 to make electrical contact therewith.

In the central portion of the disc 46 there is a thimble 56 provided with a bore 58 inside of which there are provided contact spring members indicated at 60. This thimble is designed to receive the upper pin portion 28 of the rod 22.

The arrangements just described at the lower portion of the apparatus supporting frame are designed to facilitate assembly and insure good electrical connections with the coil 34. The frame 44 is adapted to be fixed within the casing 2. When the nose assembly is threaded into the casing, the pin 28 enters the thimble 56 and as assembly nears completion, the bevel 14 engages the pins 52. As rotation proceeds sliding contacts exist so that when the assembly is completed and the nose tightly engaged with the casing 2, good electrical contacts are provided to both ends of the coil 34.

In Figure 3 there are illustrated the electrical and recording elements of the apparatus in a diagrammatic form. The high frequency generator preferably comprises a crystal-controlled oscillating circuit of conventional type, including a tube 62 preferably of the screen grid type the frequency of oscillation of which is maintained constant by means of a crystal 64. The plate tank circuit is made up of the exploratory coil 34, a coupling coil 66 and a tunable condenser 68 initially set to the proper value for best oscillating conditions and maximum sensitivity. With the coupling coil 66 there is coupled a link 70, preferably of tuned type adapted to energize a lamp 72 which acts as an indicator of the oscillating condition of the circuit. Recording is preferably accomplished through the medium of a self-generating photocell, indicated at 74, connected to a sensitive galvanometer indicated at 76, which in conjunction with a lamp 78 energized by a battery 79 and a suitable optical system causes the projection of a spot of light on a film 80, the transverse position of which spot will depend upon the current through the lamp 72, and hence the operating condition of the generator circuit. The film 80 is continuously advanced through suitable reduction gearing by a motor 82. The type of record thus produced will be readily understood from consideration of said Bazzoni and Razek application.

Timing marks may be formed on the record either by timing means within the casing synchronized with a clock at the surface or, as illustrated, by means of a lamp 84 arranged in conjunction with an optical system to project a spot of light on the margin of film 80 when it is energized momentarily at fixed intervals through a contacting cable 86 running to the surface and supporting the instrument. The illumination of the lamp 84 may be under control of a clockwork switch 88, energy being derived from a battery 90.

The mechanical features of the nose arrangement will be readily understood from the description given above. The electrical features will become apparent from a consideration of the wiring diagram of Figure 3. It will be noted that substantially any coupling to a measuring apparatus will necessarily involve some inductance such as the coupling coil 66, which may comprise only one or very few turns. However, despite the fact that such an inductance may be small, it constitutes an appreciable part of the inductance of the entire circuit when high frequencies are being generated and consequently it becomes important to reduce as far as possible the other inductances in the circuit to provide as high an inductance in the coil 34 as possible. The concentric arrangement of the conducting means to the coil consisting of the rod 42 and the sleeve 12 tends to minimize inductance effects arising from the proximity of the steel member 4. The sleeve 12, for example, may be of brass, as may also be the ring 16. The concentric conductor arrangement thus provided minimizes inductive effects.

There is indicated in dotted lines in Figure 3 a condenser 92 shunting the coil 34. This condenser has been illustrated to indicate the presence of stray capacities between the leads to the coil 34. It would be obvious that if the value of the capacity at 92 reaches any substantial value at the high frequencies which are preferably used, the effective inductance of the coil 34 and its reaction on the circuit by reason of its being surrounded by various materials would be very substantially reduced. For this reason, it is desirable to keep as far from each other as possible the leads to the coil 34. This result is achieved through the use of the rod 22 and the concentric sleeve 12 spaced as far from the rod as possible by the nut 26 and the upwardly projecting top of the nosepiece 18. By the compression type of assembly of the various parts forming the nose a strong and extremely tight joint may be provided while keeping spaced to a very considerable extent the leads to the coil. The conductive connection arrangement to the rod 22 and sleeve 12 permits this optimum arrangement of the conducting leads consistently with proper and convenient tightening of the joint.

It will be obvious that various modifications of the specific arrangement disclosed may be made without departing from the invention.

What we claim and desire to protect by Letters Patent is:

1. In combination with a protective casing adapted to be lowered into a bore hole and having an opening therein, means for closing said opening against high pressures and for permitting the passage of electrical current comprising an inner conductor, an outer conductor at least partially surrounding said inner conductor and substantially spaced therefrom to reduce the capacity between them, insulating means for maintaining said conductors in spaced relationship with respect to each other, and means for assembling said conductors with the protective casing to provide a fluid tight closure for said opening.

2. In combination with a protective casing adapted to be lowered into a bore hole and having an opening therein, means for closing said opening against high pressures and for permitting the passage of electrical current comprising an inner conductor, an outer conductor at least partially surrounding said inner conductor and substantially spaced therefrom to reduce the capacity between them, said inner and outer conductors being without radial overlap, insulating means for maintaining said conductors in spaced relationship with respect to each other, and means for assembling said conductors with the protective casing to provide a fluid tight closure for said opening.

3. In combination with a protective casing adapted to be lowered into a bore hole and having an opening therein, means for closing said opening against high pressures and for permitting the passage of electrical current comprising an inner conductor, an outer conductor at least partially surrounding said inner conductor and substantially spaced therefrom to reduce the capacity between them, insulating means for maintaining said conductors in spaced relationship with respect to each other, means for assembling said conductors with the protective casing to provide a fluid tight closure for said opening, and means carried by said inner conductor for supporting a coil.

4. In combination with a protective casing adapted to be lowered into a bore hole and having an opening therein, means for closing said opening against high pressures and for permitting the passage of electrical current comprising an annular insulating member surrounding said opening, a conducting member insulated from the casing by said annular insulating member, means for clamping said conducting member against the insulating member, said clamping means providing insulation between the casing and conducting member, and a wrapping of insulating plastic material surrounding said opening and closing means and adapted to be compacted by high pressures to close the joints in the assembly.

5. In combination with a protective casing adapted to be lowered into a bore hole and having an opening therein, means for closing said opening against high pressures and for permitting the passage of electrical current, and a wrapping of plastic material about the joints of the assembly to prevent leakage therethrough.

6. In combination with a protective casing adapted to be lowered into a bore hole and having an opening therein, means providing a cap for said opening and permitting the passage of electrical current, and rubber wrapping about the junction of the casing and closing means.

7. In combination with a protective casing adapted to be lowered into a bore hole and having an opening therein, a closure means arranged to be threaded to said casing to close said opening and provided with an insulated conducting member, and means within the casing arranged to provide a wiping electrical contact with said conducting member when the closure means is threaded to said casing.

LACOSTE G. ELLIS.
JOHN W. MILLINGTON.